(12) United States Patent
Morioka et al.

(10) Patent No.: US 9,488,792 B2
(45) Date of Patent: Nov. 8, 2016

(54) OPTICAL RECEPTACLE, AND OPTICAL MODULE PROVIDED WITH SAME

(71) Applicant: Enplas Corporation, Saitama (JP)

(72) Inventors: Shimpei Morioka, Saitama (JP); Kazutaka Shibuya, Saitama (JP); Masahiro Tanazawa, Saitama (JP)

(73) Assignee: Enplas Corporation, Saitama (JP)

( * ) Notice: Subject to any disclaimer, the term of this patent is extended or adjusted under 35 U.S.C. 154(b) by 145 days.

(21) Appl. No.: 14/405,503

(22) PCT Filed: Jun. 3, 2013

(86) PCT No.: PCT/JP2013/003479
§ 371 (c)(1),
(2) Date: Dec. 4, 2014

(87) PCT Pub. No.: WO2013/183272
PCT Pub. Date: Dec. 12, 2013

(65) Prior Publication Data
US 2015/0338590 A1    Nov. 26, 2015

(30) Foreign Application Priority Data
Jun. 5, 2012  (JP) .................... 2012-127926

(51) Int. Cl.
G02B 6/42 (2006.01)
G02B 6/32 (2006.01)
G02B 6/38 (2006.01)

(52) U.S. Cl.
CPC .............. *G02B 6/4286* (2013.01); *G02B 6/32* (2013.01); *G02B 6/4214* (2013.01); *G02B 6/4246* (2013.01); *G02B 6/4249* (2013.01); *G02B 6/4259* (2013.01); *G02B 6/4292* (2013.01); *G02B 6/3853* (2013.01); *G02B 6/3885* (2013.01); *G02B 6/4204* (2013.01)

(58) Field of Classification Search
None
See application file for complete search history.

(56) References Cited

U.S. PATENT DOCUMENTS

| | | | |
|---|---|---|---|
| 4,732,446 A | 3/1988 | Gipson et al. | |
| 6,385,374 B2 * | 5/2002 | Kropp | G02B 6/4246 385/24 |
| 6,636,540 B2 * | 10/2003 | Uebbing | H01S 5/02292 372/36 |
| 7,539,367 B2 * | 5/2009 | Tamura | G02B 6/4214 385/14 |
| 8,335,411 B2 * | 12/2012 | Kuznia | G02B 6/4214 385/14 |
| 8,724,944 B2 * | 5/2014 | Kuznia | G02B 6/4214 385/14 |
| 9,110,257 B2 * | 8/2015 | Morioka | G02B 6/4204 |
| 9,166,694 B2 * | 10/2015 | Otte | G02B 6/4206 |

(Continued)

FOREIGN PATENT DOCUMENTS

| | | |
|---|---|---|
| JP | 2003-227970 A | 8/2003 |
| JP | 2005-275286 A | 10/2005 |

(Continued)

*Primary Examiner* — Michelle R Connelly
(74) *Attorney, Agent, or Firm* — Brundidge & Stanger, P.C.

(57) ABSTRACT

A surface (17$d'$) facing a photoelectric conversion apparatus is formed on the optical block (3) side, said surface having light from a light emitting element (10) inputted thereto and monitor light outputted therefrom, and a coupling light output surface (12) having coupling light outputted therefrom is formed on the optical housing (4) side, and consequently, the surface (17$d'$) and the coupling light output surface (12) are simply and highly accurately formed. Then, an optical block (3) and an optical housing (4) are simply and accurately combined by being fitted together by means of fitting sections (21, 24). Adhesion of foreign materials and formation of scratches on the reflecting surface (18) of the optical block (3) are suppressed by covering the reflecting surface (18) with the optical housing (4).

9 Claims, 11 Drawing Sheets

(56) References Cited

U.S. PATENT DOCUMENTS

| | | | |
|---|---|---|---|
| 9,310,530 B2* | 4/2016 | Morioka | G02B 6/4286 |
| 2003/0152336 A1* | 8/2003 | Gurevich | G02B 6/4206 |
| | | | 385/88 |
| 2006/0104576 A1 | 5/2006 | Nagasaka | |
| 2006/0182442 A1 | 8/2006 | Nagasaka | |
| 2009/0252455 A1 | 10/2009 | Ohta et al. | |
| 2010/0074579 A1 | 3/2010 | Fujii et al. | |
| 2012/0183269 A1 | 7/2012 | Ohta et al. | |
| 2012/0263416 A1 | 10/2012 | Morioka | |
| 2013/0266260 A1* | 10/2013 | Morioka | G02B 6/4214 |
| | | | 385/33 |
| 2015/0131947 A1* | 5/2015 | Morioka | G02B 6/4204 |
| | | | 385/93 |

FOREIGN PATENT DOCUMENTS

| | | |
|---|---|---|
| JP | 2006-139098 A | 6/2006 |
| JP | 2006-215288 A | 8/2006 |
| JP | 2006-227043 A | 8/2006 |
| JP | 2009-104096 A | 5/2009 |
| JP | 2010-078882 A | 4/2010 |
| JP | 2011-133807 A | 7/2011 |
| WO | 2011/077723 A1 | 6/2011 |

* cited by examiner

OPTICAL RECEPTACLE, AND OPTICAL MODULE PROVIDED WITH SAME

TECHNICAL FIELD

The present invention relates to an optical receptacle and an optical module including the same. In particular, the present invention relates to an optical receptacle and an optical module including the same suitable for optically coupling a light emitting element and an optical transmission member.

BACKGROUND ART

Conventionally, in optical communications using optical fibers, an optical module such as a surface-emitting laser (for example, VCSEL: Vertical Cavity Surface Emitting Laser) having a light emitting element has been used.

In such an optical module, an optical module component called optical receptacle is used. The optical receptacle couples light including communication information emitted from a light emitting element with an end surface of an optical fiber, and thus achieves optical transmission through the optical fiber.

Conventionally, in the optical module, for the purpose of adjusting the light output or stabilizing the output characteristics of an light emitting element due to temperature variation, various techniques for monitoring (observing) the light (intensity and light amount) emitted from a light emitting element have been proposed.

For example, PTL 1, which has been made by the present inventor, discloses an invention directed to an optical module including a lens array which is an example of optical receptacles. In the invention disclosed in PTL 1, laser light emitted from a light emitting element is first incident on a first lens surface, and then reflected by a reflecting surface toward an optical fiber side, and thereafter, separated into coupling light directed to the optical fiber and monitoring light by a reflection-and-transmission layer disposed in a recess of a lens array main body. Then, after sequentially passing through a prism disposed in the recess, a filler, and the lens array main body, the coupling light is output from a second lens surface toward an end surface of an optical fiber. On the other hand, after passing through the lens array main body, the monitoring light is output from a third lens surface toward a light-receiving element.

CITATION LIST

Patent Literature

PTL 1
Japanese Patent Application Laid-Open No. 2011-133807

SUMMARY OF INVENTION

Technical Problem

According to the invention disclosed in PTL 1, by utilizing reflection and transmission at a reflection-and-transmission layer, the monitoring light can be simply and surely obtained while appropriately ensuring the light path of the coupling light.

On the basis of the advantage of the invention disclosed in PTL 1, the present inventor achieved the present invention as a result of earnest research for improving the manufacturability and reliability.

An object of the present invention is to provide an optical receptacle and an optical module including the optical receptacle which can improve manufacturability and reliability by simply and highly accurately manufacturing optical surfaces in comparison with the case where a surface on which light of a light emitting element is incident and from which monitoring light is output and an emission surface of coupling light are integrally manufactured, and by limiting adhesion of foreign matters and damage on the light path.

Solution to Problem

The present invention relates to the optical receptacle and the optical module described below.

[1] An optical receptacle that optically couples a light emitting element and an optical transmission member together when the optical receptacle is disposed between a photoelectric conversion device and the optical transmission member, the photoelectric conversion device including the light emitting element and a light-receiving element that receives monitoring light for monitoring light output from the light emitting element, the optical receptacle including: a light-transmissive optical block that is so disposed as to face the photoelectric conversion device; an optical block which is light-transmissive and is disposed to face the photoelectric conversion device; an optical housing which is light-transmissive and houses the optical block therein, the optical housing including an opening that opens to the photoelectric conversion device side such that the optical block is exposed on the photoelectric conversion device side; and a filler which is light-transmissive and provided between the optical housing and the optical block, wherein: the optical block includes a photoelectric conversion device-facing surface on which light from the light emitting element is incident and from which the monitoring light is output toward the light-receiving element, a reflecting surface disposed on a surface opposite to the photoelectric conversion device-facing surface at a predetermined tilted angle relative to the photoelectric conversion device-facing surface, the reflecting surface being configured to receive light of the light emitting element incident on the photoelectric conversion device-facing surface, and reflect the light of the light emitting element thus received toward the optical transmission member, a tilted optical surface disposed on a surface opposite to the photoelectric conversion device-facing surface at a position toward which the light of the light emitting element reflected by the reflecting surface travels, the tilted optical surface being disposed at a predetermined tilted angle relative to the photoelectric conversion device-facing surface, and being configured to receive the light of the light emitting element reflected by the reflecting surface, a reflection-and-transmission layer disposed on the tilted optical surface, and configured to reflect the light of the light emitting element that reached the tilted optical surface toward the photoelectric conversion device-facing surface at a predetermined reflectance as the monitoring light, and to transmit the light of the light emitting element that reached the tilted optical surface to the optical transmission member side at a predetermined transmittance as coupling light to be coupled to the optical transmission member, and an optical block-fitting part disposed on a surface opposite to the photoelectric conversion device-facing surface at a position between the reflecting surface and the tilted optical surface, the optical block-fitting part being configured to fit the optical block and the optical housing together, the optical housing includes a coupling light incidence surface disposed on an internal wall surface of a housing side wall part of the optical housing that is so disposed as to face the optical transmission member, the coupling light incidence surface being a surface on which the coupling light is incident, a coupling light emission surface disposed on an external wall surface of the housing side wall part, the coupling light emission surface being configured to receive the coupling light incident on the coupling light incidence surface, and to output the coupling light thus received toward the optical transmission member, and an optical housing-fitting part disposed at a position corresponding to the optical block-fitting part on a housing top wall part of the optical housing that shields the optical block from a side opposite to the photoelectric conversion device, the optical housing-fitting part being configured to fit with the optical block-fitting part, and the filler is provided between the reflection-and-transmission layer and the coupling light incidence surface.

[2] The optical receptacle according to [1], wherein the reflecting surface is disposed in such a manner that the reflecting surface reflects light of the light emitting element in a direction parallel to a direction in which the coupling light is output from the coupling light emission surface, and refractive indices of the optical block, the optical housing and the filler are selected and angles of the tilted optical surface and the coupling light incidence surface are selected as necessary, so as to provide along a same line a light path of the coupling light between the coupling light incidence surface and the coupling light emission surface, and a light path of the coupling light just output from the coupling light emission surface.

[3] The optical receptacle according to [2], wherein the refractive indices of the optical block, the optical housing and the filler are selected such that differences between the refractive indices are each equal to or smaller than a predetermined value.

[4] The optical receptacle according to any one of [1] to [3], wherein the filler is composed of an ultraviolet ray-curable adhesive agent, and at least one of the optical block and the optical housing is formed of an ultraviolet ray-transmitting material.

[5] The optical receptacle according to any one of [1] to [4], wherein the reflecting surface is a total reflection surface on which light of the light emitting element is incident at an incident angle greater than a critical angle, and by which the light of the light emitting element incident on the total reflection surface is totally reflected toward the tilted optical surface.

[6] The optical receptacle according to any one of [1] to [5], wherein a first lens surface configured to input light of the light emitting element toward the reflecting surface is disposed at a position corresponding to the light emitting element on the photoelectric conversion device-facing surface, the coupling light emission surface is a second lens surface, and a third lens surface configured to output the monitoring light toward the light-receiving element is disposed at a position corresponding to the light-receiving element on the photoelectric conversion device-facing surface.

[7] An optical module including: the optical receptacle according to any one of [1] to [6]; and the photoelectric conversion device according to [1].

Advantageous Effects of Invention

According to the invention of [1], the photoelectric conversion device-facing surface on which light of the light emitting element is incident and from which monitoring light is output is formed in the optical block, and the coupling light emission surface from which coupling light is output is formed in the optical housing, and thus, the photoelectric conversion device-facing surface and the coupling light emission surface can be simply and highly accurately formed. On top of that, since the optical block and the optical housing can be simply and accurately fitted with each other by the fitting parts, the optical receptacle with sufficient dimensional accuracy can be readily manufactured. In addition, since the optical block reflecting surface can be shielded with the optical housing, adhesion of foreign matters and damage on the reflecting surface can be limited. Consequently, stable optical performance can be ensured, and high reliability can be achieved.

According to the invention of [2], by ensuring the linearity of the light path of the coupling light having passed through the coupling light incidence surface, the influence on the efficiency of the coupling to the optical transmission member can be eliminated even when a manufacturing error of the light path length between the coupling light incidence surface and the coupling light emission surface is caused. In addition, the light path of the coupling light having a sufficient linearity can be relatively easily designed by appropriately selecting the reflection direction of the light of the light emitting element on the reflecting surface.

According to the invention of [3], regardless of the angles of the tilted optical surface and the coupling light incidence surface, the light path of the light of the light emitting element between the reflecting surface and the tilted optical surface and the light path of the coupling light can be provided along substantially the same line. Thus, in the case where deviation of the coupling position of the optical transmission member is found during the product test, the number of parts that require dimensional adjustment for eliminating the deviation can be reduced, and manufacturability can be further facilitated.

According to the invention of [4], by stably and efficiently fixing the optical block in the optical housing, mechanical strength and manufacturing efficiency can be improved.

According to the invention of [5], since the reflecting surface can be readily formed, the number of components and cost can be reduced.

According to the invention of [6], by forming the first lens surface and the third lens surface in the optical block, and by forming the second lens surface in the optical housing, the lens surfaces can be simply and highly accurately formed.

According to the invention of [7], the optical receptacle with sufficient dimensional accuracy can be readily manufactured, and adhesion of foreign matters and damage on the reflecting surface can be limited.

As described, according to the present invention, it is possible to improve manufacturability and reliability by simply and highly accurately manufacturing the optical surfaces in comparison with the case where the surface on which the light of the light emitting element is incident and from which the monitoring light is output and the surface from which the coupling light is output are integrally manufactured, and by limiting adhesion of foreign matters and damage on the light path.

DESCRIPTION OF EMBODIMENTS

In the following, an optical receptacle and an optical module according to an embodiment of the present invention will be described with reference to FIG. 1 to FIG. 11.

Figure 1:
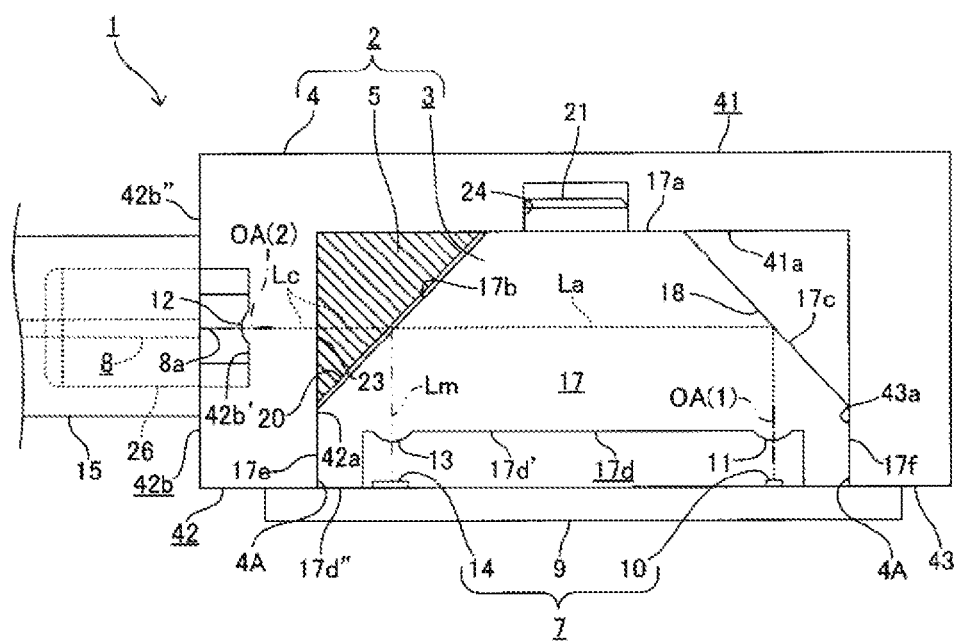
FIG. 1 is a schematic diagram that schematically illustrates a configuration of an optical module according to an embodiment of the present invention, with a longitudinal sectional view of a lens array serving as an optical receptacle according to the embodiment of the present invention.

FIG. 1 is a schematic diagram that schematically illustrates a configuration of optical module 1 of the present embodiment, with a longitudinal sectional view of lens array 2 serving as an optical receptacle of the present embodiment.

Figure 2:
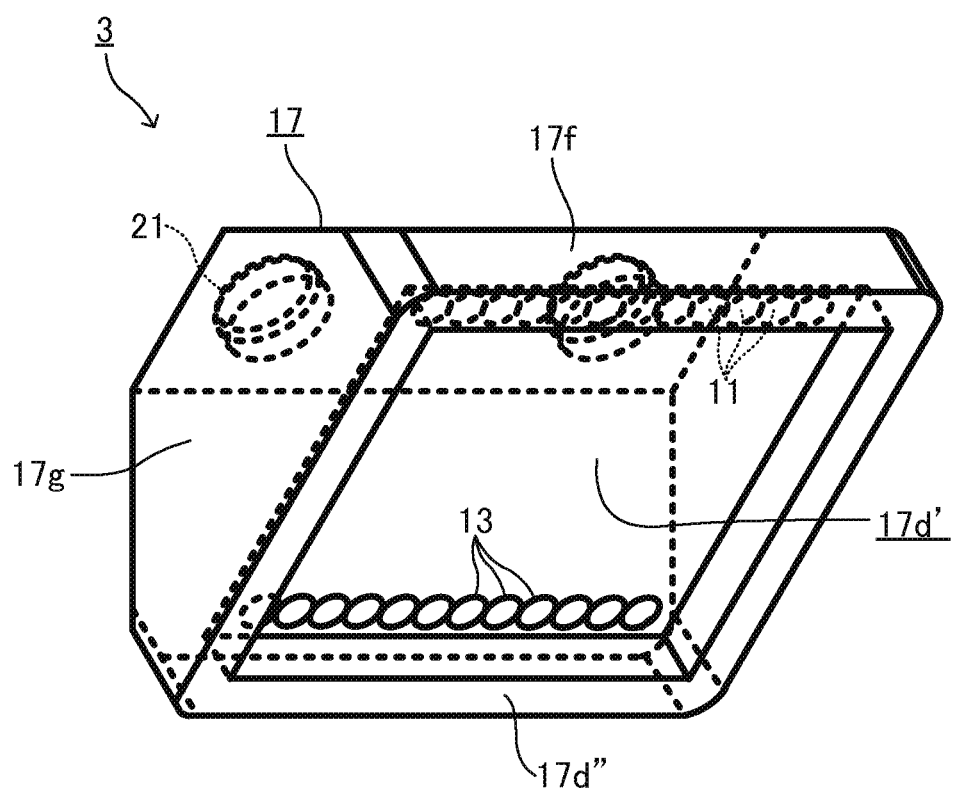
FIG. 2 is an upward perspective view of an optical block in the lens array illustrated in FIG. 1.
Figure 3:
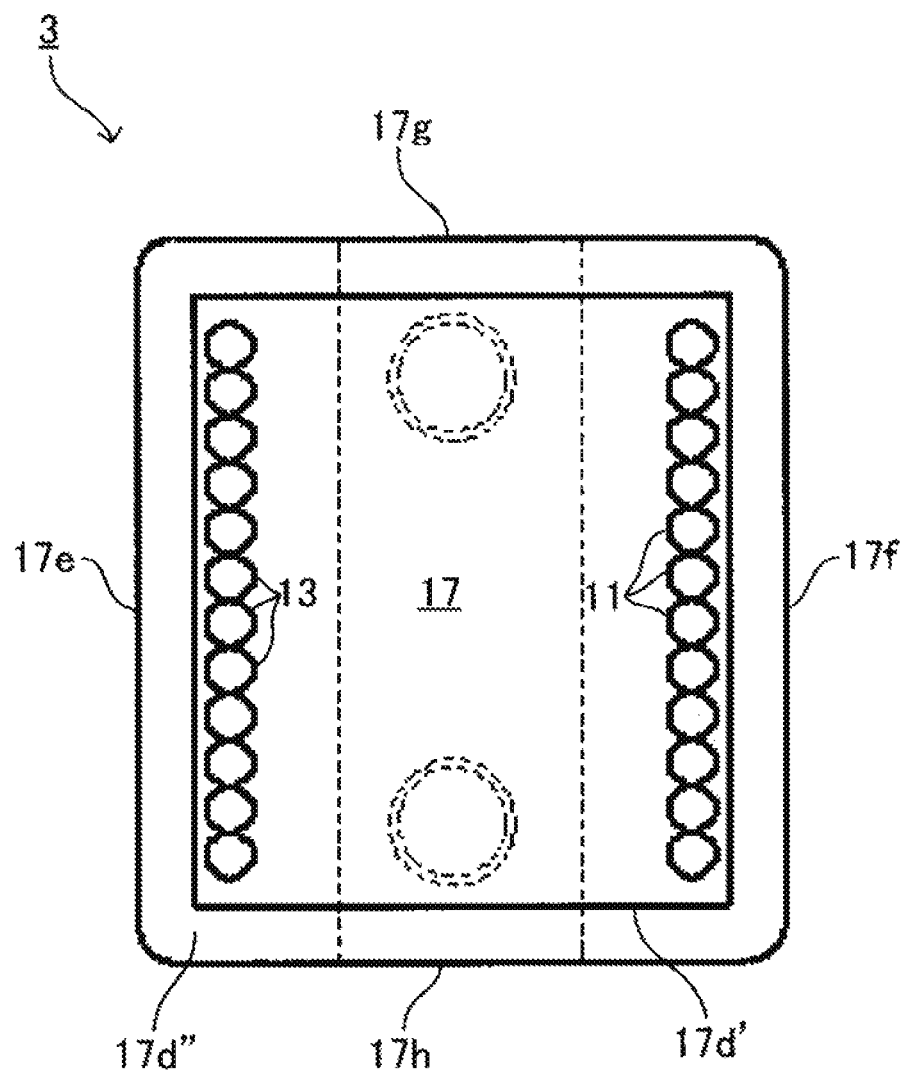
FIG. 3 is a bottom view of the optical block.
Figure 4:
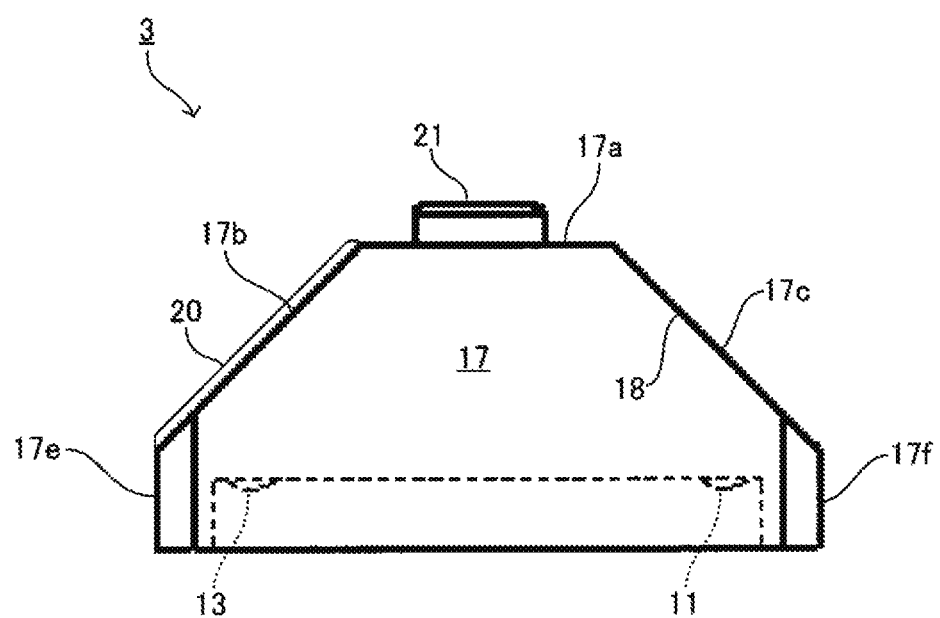
FIG. 4 is a front view of the optical block.
Figure 5:
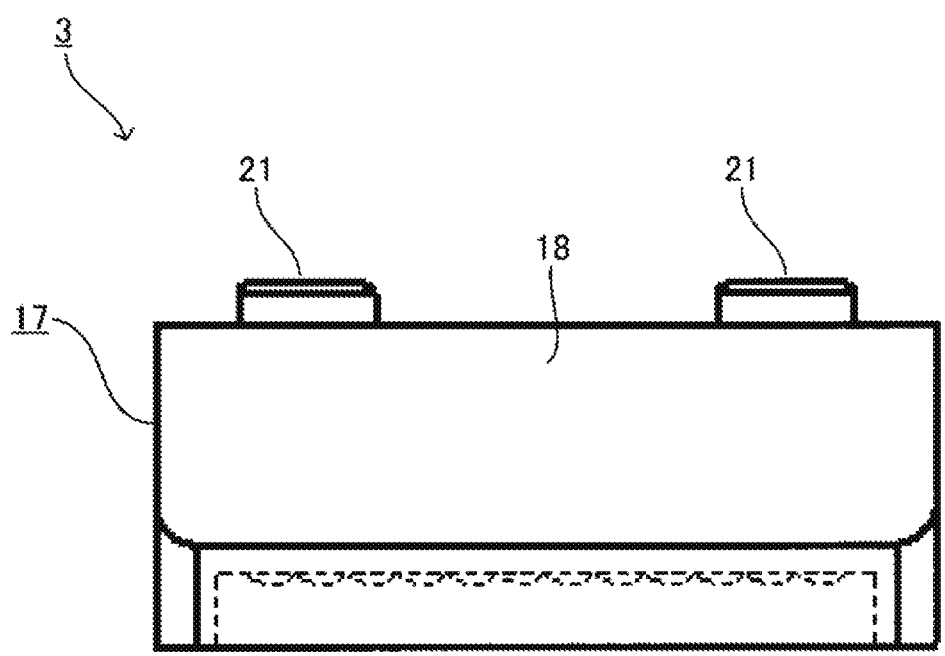
FIG. 5 is a right side view of the optical block.

FIG. 2 to FIG. 5 illustrate optical block 3 described later in lens array 2 illustrated in FIG. 1. To be more specific, FIG. 2 is an upward perspective view of optical block 3, FIG. 3 is a bottom view of optical block 3, FIG. 4 is a front view of optical block 3, and FIG. 5 a right side view of optical block 3 illustrated in FIG. 4.

Figure 6:
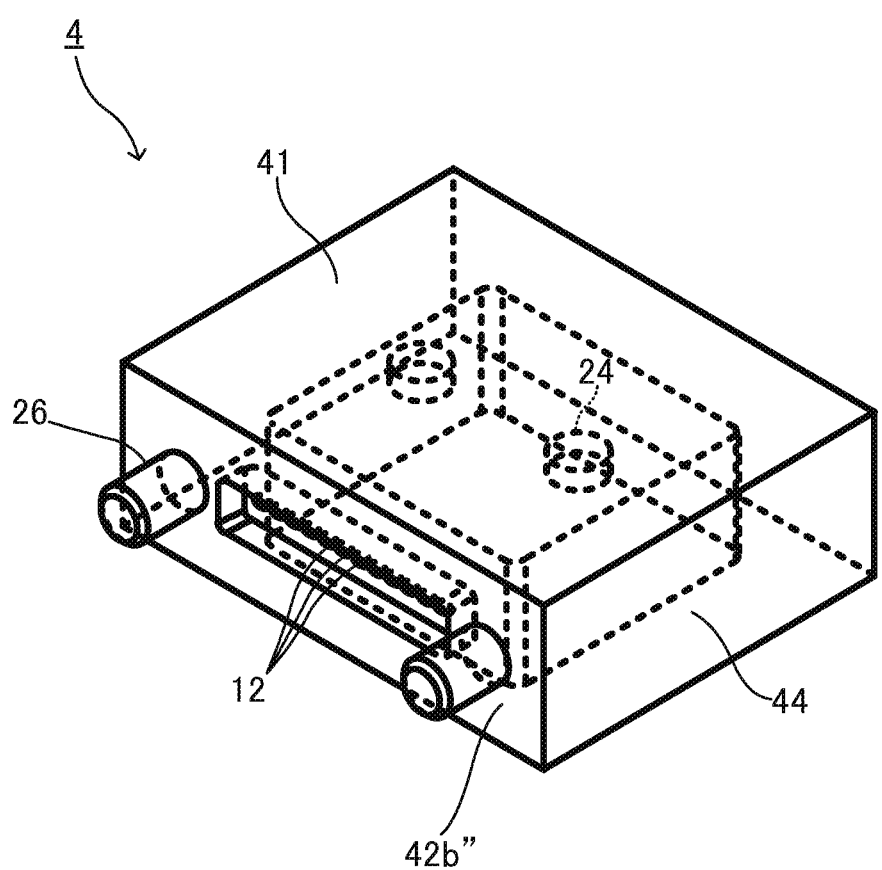
FIG. 6 is a downward perspective view of an optical housing in the lens array illustrated in FIG. 1.
Figure 7:
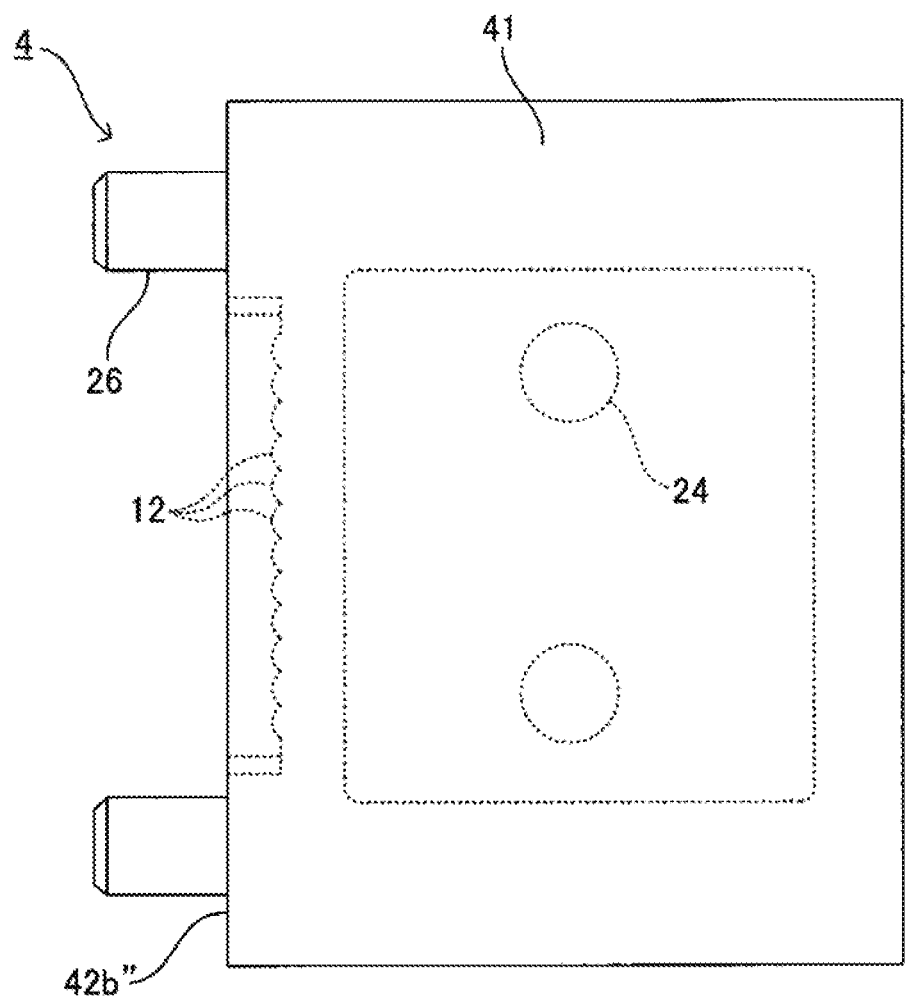
FIG. 7 is a plan view of the optical housing.
Figure 8:
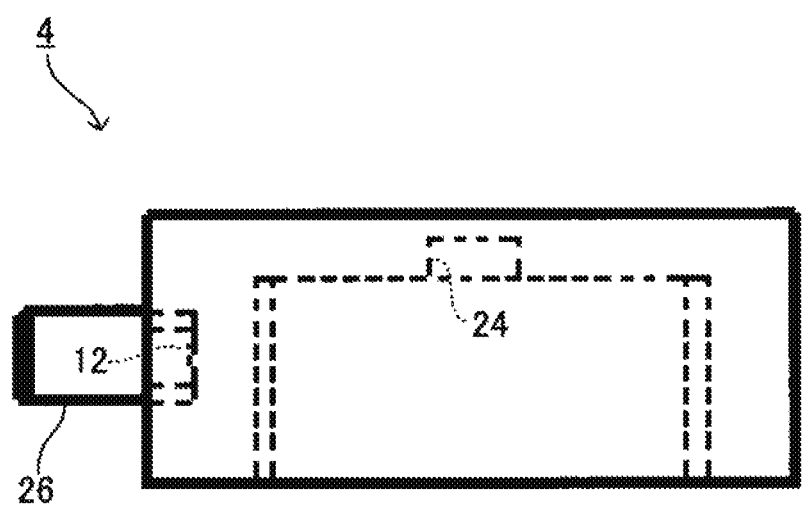
FIG. 8 is a front view of the optical housing.
Figure 9:
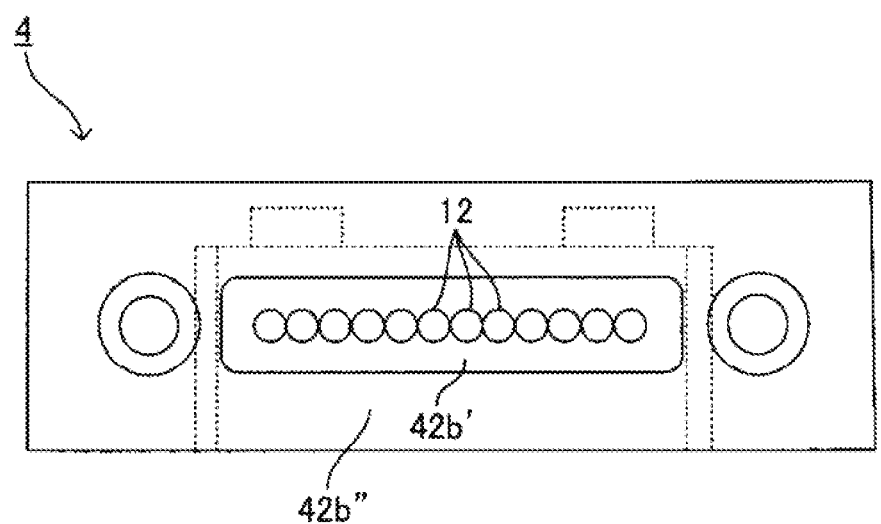
FIG. 9 is a left side view of the optical housing.
Figure 10:
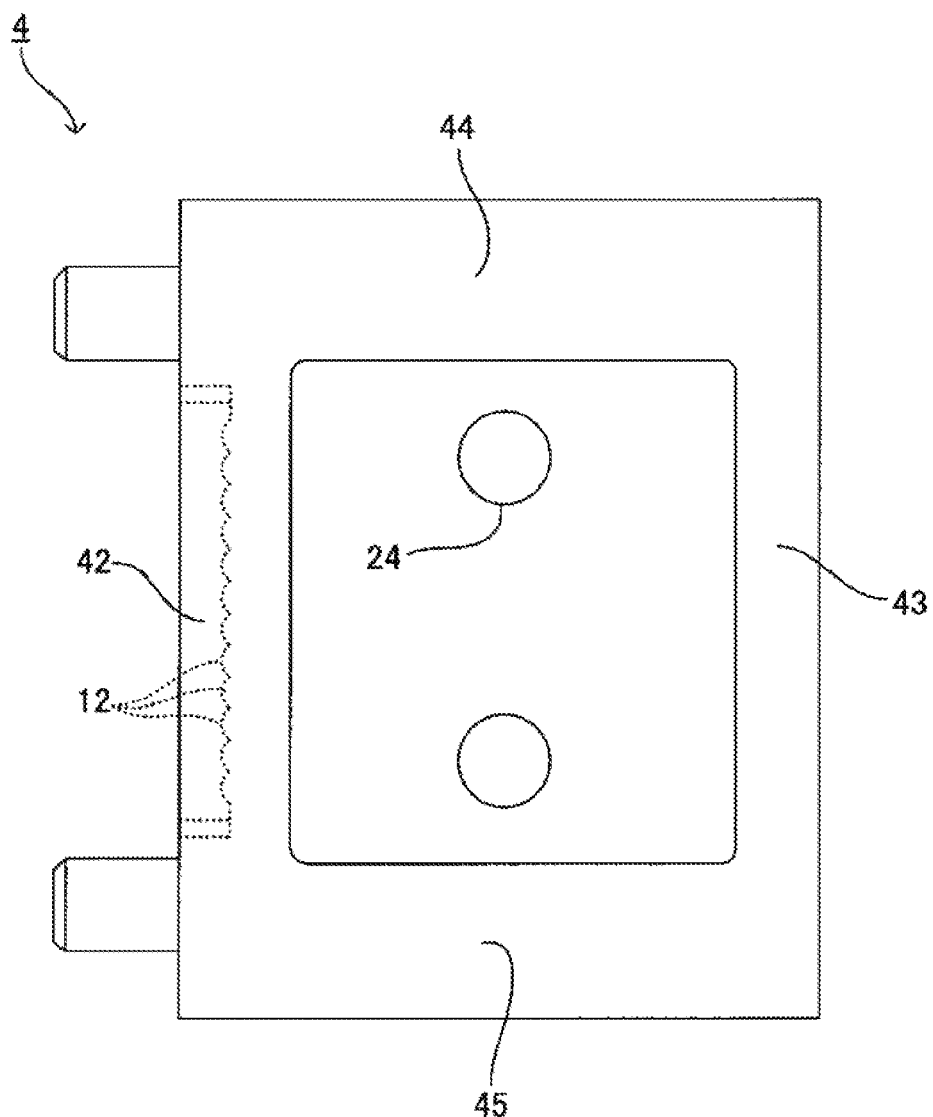
FIG. 10 is a bottom view of the optical housing.

FIG. 6 to FIG. 10 illustrate optical housing 4 described later in lens array 2 in FIG. 1. To be more specific, FIG. 6 is a downward perspective view of optical housing 4, FIG. 7 is a plan view of optical housing 4, FIG. 8 is a front view of optical housing 4, FIG. 9 is a left side view of optical housing 4 illustrated in FIG. 8, and FIG. 10 is a bottom view of optical housing 4 illustrated in FIG. 8.

Returning back to FIG. 1, lens array 2 of the present embodiment is disposed between photoelectric conversion device 7 and optical fiber 8 serving as an optical transmission member. In FIG. 1, photoelectric conversion device 7 is disposed below lens array 2, and optical fiber 8 is disposed on the left side of lens array 2.

[Details of Configuration of Photoelectric Conversion Device]

Photoelectric conversion device 7 includes a plurality of light emitting elements 10 disposed on a surface of semiconductor substrate 9 which faces lens array 2 (top surface in FIG. 1). Light emitting elements 10 emit (output) laser light La in a direction (in FIG. 1, upward) perpendicular to the surface of semiconductor substrate 9 which faces lens array 2. Light emitting elements 10 compose the above-described VCSEL (vertical cavity surface emitting laser). It is to be noted that, in FIG. 1, light emitting elements 10 are laid out along the depth direction in FIG. 1. In addition, photoelectric conversion device 7 includes a plurality of light-receiving elements 14 that are disposed on the surface of semiconductor substrate 9 which faces lens array 2 and on the left side relative to light emitting element 10 in FIG. 1. Light-receiving elements 14 are configured to receive monitoring light Lm for monitoring the output (for example, the intensity and the amount of light) of laser light La emitted from light emitting elements 10. The number of light-receiving elements 14 is the same as that of light emitting elements 10. It is to be noted that light-receiving elements 14 and light emitting elements 10 are aligned in the same direction, and the positions of light emitting element 10 and light-receiving element 14 corresponding to each other match in the alignment direction. That is, light-receiving elements 14 are laid out at the same pitch as that of light emitting elements 10. Light-receiving elements 14 may be photodetectors. In addition, as long as at least one light-receiving element 14 is disposed, the number of light-receiving elements 14 may not be the same as that of light emitting elements 10, and the number of light-receiving elements 14 may be smaller than that of light emitting element 10. Further, although not shown in the drawings, photoelectric conversion device 7 is connected with a control circuit that controls the output of laser light La emitted from light emitting element 10 based on the intensity and the amount of monitoring light Lm received by light-receiving element 14. Such a photoelectric conversion device 7 is so disposed as to face lens array 2, with semiconductor substrate 9 making contact with lens array 2, for example. Photoelectric conversion device 7 is attached to lens array 2 with a generally known fixing member not illustrated in the drawings such as a clamp spring, and thus composes optical module 1 together with lens array 2, for example.

[Details of Configuration of Optical Fiber]

In addition, the number of optical fibers 8 of the present embodiment is the same as that of light emitting elements 10 and light-receiving elements 14, and optical fibers 8 are laid out at the same pitch as that of light emitting elements 10 along the depth direction in FIG. 1. Optical fibers 8 have the same size and are of a multiple mode type, for example. A portion on end surface 8a side of each optical fiber 8 is held in optical connector 15 of a multicore collective type such as an MT connector. Such an optical fiber 8 is attached to lens array 2 with a publicly known fixing member not shown in the drawings (for example, a clamp spring), with the end surface of optical connector 15 on the lens array 2 side making contact with lens array 2, for example.

Lens array 2 disposed between photoelectric conversion device 7 and optical fiber 8 having the above-mentioned configuration optically couples light emitting elements 10 and end surfaces 8a of optical fibers 8.

[Details of Configuration of Lens Array]

Now lens array 2 is further specifically described. As illustrated in FIG. 1, lens array 2 includes light-transmissive optical block 3 that is so disposed as to face photoelectric conversion device 7, light-transmissive optical housing 4 that houses optical block 3 therein, and light-transmissive filler 5 provided between optical housing 4 and optical block 3. As illustrated in FIG. 1, in optical housing 4, optical block 3 is exposed on photoelectric conversion device 7 side by opening 4A that opens to photoelectric conversion device 7 side.

[Details of Optical Block]

First, details of optical block 3 are described. As illustrated in FIG. 1 to FIG. 5, optical block 3 includes optical block main body 17. Optical block main body 17 has an external shape of a substantially hexagonal prism in which a pair of corners sandwiching one surface of the cuboid is obliquely cut away.

That is, as illustrated in FIG. 1 to FIG. 5, the external shape of optical block main body 17 is roughly composed of upper horizontal surface 17a, upper left tilted surface 17b, upper right tilted surface 17c, lower surface 17d, left surface 17e, right surface 17f, front surface 17g and rear surface 17h. Upper horizontal surface 17a and lower surface 17d are parallel to each other. Left and right surfaces 17e and 17f are parallel to each other, and front and rear surfaces 17g and 17h are also parallel to each other. Further, upper horizontal surface 17a and lower surface 17d are perpendicular to front, rear, left and right surfaces 17e to 17h.

<Photoelectric Conversion Device-Facing Surface>

In lower surface 17d of optical block main body 17 having the above-mentioned configuration, portion 17d' that has a substantially rectangular shape in plan view that occupies most of the center range in FIG. 3 is formed on a surface recessed upward relative to peripheral portion 17d" in FIG. 1. Portion 17d' is photoelectric conversion device-facing surface 17d' on which laser light La from light emitting element 10 is incident and from which monitoring light Lm is output toward light-receiving element 14.

<First Lens Surface>

While laser light La may be applied on photoelectric conversion device-facing surface 17d' having the above-mentioned configuration through a plane region of photoelectric conversion device-facing surface 17d', the present embodiment employs a configuration in which the light flux diameter of laser light La is appropriately controlled.

That is, at right end portions of photoelectric conversion device-facing surface 17d' which correspond to light emitting elements 10 in FIGS. 1 to 4, first lens surfaces (convex lens surface) 11 each having a circular shape in plan view are formed. The number (12) of first lens surfaces 11 is the same as that of light emitting element 10. First lens surfaces 11 are so formed as to be aligned along a predetermined direction corresponding to light emitting elements 10 (the depth direction in FIG. 1 and FIG. 4, or the vertical direction in FIG. 3). Further, first lens surfaces 11 are formed in the same size, and at the same pitch as that of light emitting elements 10. It is to be noted that first lens surfaces 11 adjacent to each other in the alignment direction may be in contact with each other at their circumferential end. Preferably, as illustrated in FIG. 1, optical axis OA (1) of each first lens surface 11 matches the central axis of laser light La emitted from light emitting element 10 corresponding to the first lens surface 11. More preferably, optical axis OA (1) of each first lens surface 11 is perpendicular to photoelectric conversion device-facing surface 17d'.

As illustrated in FIG. 1, on each first lens surface 11 having the above-mentioned configuration, laser light La emitted from light emitting element 10 corresponding to the first lens surface 11 is incident. Each first lens surface 11 converges (refracts) laser light La (light flux having a predetermined spread angle) from light emitting element 10 while allowing laser light La to travel into optical block main body 17. It is to be noted that each first lens surface 11 may collimate laser light La emitted from light emitting element 10 corresponding to the first lens surface 11, or may converge laser light La emitted from light emitting element 10 corresponding to the first lens surface 11 in such a manner that the beam diameter of laser light La gradually increases as it travels along the travelling direction (to weakly converge as compared to the case of collimating). The degree of the convergence of laser light La may be appropriately selected by selecting the power, aspherical surface coefficient, and the like of first lens surface 11, for example. When laser light La is weakly converged as compared with the case where laser light La is collimated at first lens surface 11, even when foreign matters are attached or damage is caused on second lens surfaces 12 described later (see FIG. 1), the area occupancy of the foreign matters or damage relative to the light spot on second lens surfaces 12 can be reduced. As a result, the influence of the foreign matters or damage on the coupling efficiency can be effectively reduced.

<Reflecting Surface>

Laser light La from light emitting elements 10 which is incident on first lens surfaces 11 and enters optical block main body 17 in the above-mentioned manner travels upward in optical block main body 17 as illustrated in FIG. 1.

Here, as can be seen in FIG. 1, above first lens surfaces 11 (that is, the position opposite to first lens surfaces 11 in optical block main body 17), the above-described upper right tilted surface 17c is disposed. Upper right tilted surface 17c is a part of the surface facing away from photoelectric conversion device-facing surface 17d'.

As illustrated in FIG. 1, reflecting surface 18 is formed on upper right tilted surface 17c.

As illustrated in FIG. 1, reflecting surface 18 is a tilted surface that is tilted leftward toward the upper side, and has a predetermined tilted angle relative to photoelectric conversion device-facing surface 17d'. The tilted angle may be 45 degrees clockwise from photoelectric conversion device-facing surface 17d' as the reference angle (0 degree) in FIG. 1.

On reflecting surface 18 having the above-mentioned configuration, laser light La from light emitting elements 10 incident on first lens surfaces 11 is incident (reaches) from below in FIG. 1, as illustrated in FIG. 1.

Then, reflecting surface 18 reflects laser light La emitted from light emitting elements 10 toward the left side in FIG. 1. It is to be noted that the direction in which laser light La is reflected by reflecting surface 18 is parallel to the direction in which fiber coupling light Lc (see FIG. 1) is output from second lens surfaces 12 described later.

Reflecting surface 18 having the above-mentioned configuration may be composed only of upper right tilted surface 17c, or may be formed by coating upper right tilted surface 17c with a reflection film made of Au, Ag, Al or the like. It is to be noted that, when reflecting surface 18 is composed only of upper right tilted surface 17c, the reflection of laser light La at reflecting surface 18 is the total reflection. In this case, the incident angle of laser light La on reflecting surface 18 is an angle greater than a critical angle corresponding to the refractive index of optical block main body 17 for the wavelength of laser light La.

<Tilted Optical Surface>

On the left side, relative to reflecting surface 18 having the above-mentioned configuration, in FIG. 1 and FIG. 4 to which laser light La is reflected, the above-described upper left tilted surface 17b is disposed. Upper left tilted surface 17b is a part of the surface facing away from photoelectric conversion device-facing surface 17d'.

Upper left tilted surface 17b is tilted optical surface 17b of the embodiment of the present invention.

As illustrated in FIG. 1 and FIG. 4, tilted optical surface 17b is a tilted surface that is tilted rightward toward the upper side, and has a predetermined tilted angle relative to photoelectric conversion device-facing surface 17d'. The tilted angle may be 45 degrees counterclockwise from photoelectric conversion device-facing surface 17d' as the reference angle (0 degree) in FIG. 1.

On tilted optical surface 17b having the above-mentioned configuration, laser light La from light emitting element 10 which has been reflected by reflecting surface 18 and has traveled through the inside of optical block main body 17 is incident (reaches) from the right side, as illustrated in FIG. 1.

<Reflection-and-Transmission Layer>

On tilted optical surface 17b having the above-mentioned configuration, thin reflection-and-transmission layer 20 is disposed, as illustrated in FIG. 1 and FIG. 4.

Reflection-and-transmission layer 20 may be formed by coating tilted optical surface 17b with a single layer film formed of a metal such as Ni, Cr and Al, or a dielectric multilayer film which is obtained by alternately stacking a plurality of dielectrics (for example, $TiO_2$ and $SiO_2$) having dielectric constants different from each other. In this case, publicly known coating techniques such as inconel deposition may be adopted for the coating. With such coating, reflection-and-transmission layer 20 having a considerably small thickness of 1 μm can be formed, for example.

On reflection-and-transmission layer 20 having the above-mentioned configuration, laser light La emitted from light emitting elements 10 incident on tilted optical surface 17b is directly incident, as illustrated in FIG. 1.

As illustrated in FIG. 1, reflection-and-transmission layer 20 reflects at a predetermined reflectance laser light La emitted from light emitting elements 10 as monitoring light Lm toward photoelectric conversion device-facing surface 17d' (downward), and transmits at a predetermined transmittance laser light La toward optical fiber 8 (leftward) as fiber coupling light Lc to be coupled to optical fiber 8. At this time, since the thickness of reflection-and-transmission layer 20 is small, it is not necessary to take into account the refraction of laser light La which is transmitted through reflection-and-transmission layer 20 (the transmission can be taken as straight transmission). It is to be noted that the reflectance and transmittance of reflection-and-transmission layer 20 may be set to any value according to the material, thickness and the like of reflection-and-transmission layer 20, as long as a sufficient amount of monitoring light Lm for monitoring the output of laser light La can be obtained. For example, when reflection-and-transmission layer 20 is composed of the above-described single layer film, reflection-and-transmission layer 20 may have a reflectance of 20%, and a transmittance of 60% (absorptance: 20%), although depending on its thickness. In addition, for example, when reflection-and-transmission layer 20 is composed of the above-described dielectric multilayer film, reflection-and-transmission layer 20 may have a reflectance of 10% and a transmittance of 90%, although depending on its thickness and number of the layers.

<Third Lens Surface>

Monitoring light Lm corresponding to light emitting elements 10 reflected by reflection-and-transmission layer 20 in the above-mentioned manner is output from photoelectric conversion device-facing surface 17d' toward light-receiving elements 14. While monitoring light Lm may be output from photoelectric conversion device-facing surface 17d' through a plane region of photoelectric conversion device-facing surface 17d', the present embodiment employs a configuration in which the light flux diameter and the emission direction of monitoring light Lm are appropriately controlled.

Specifically, as illustrated in FIG. 1 to FIG. 4, at positions above photoelectric conversion device-facing surface 17d' and in the vicinity of the left end portion corresponding to light-receiving elements 14, third lens surfaces (convex lens surface) 13 having a circular shape in plan view are formed. The number of third lens surfaces 13 is the same as that of light-receiving elements 14. Third lens surfaces 13 are aligned in a predetermined alignment direction corresponding to light-receiving elements 14, that is, in the direction same as the alignment direction of first lens surface 11. In addition, third lens surfaces 13 are formed in the same size at a pitch same as that of light-receiving elements 14. It is to be noted that third lens surfaces 13 adjacent to each other in the alignment direction may be in contact with each other at their circumferential end.

On each third lens surfaces 13 having the above-mentioned configuration, monitoring light Lm corresponding to the third lens surface 13 is incident from the inside of optical block main body 17, as illustrated in FIG. 1. Third lens surfaces 13 converge monitoring light Lm corresponding to light emitting elements 10 incident on third lens surfaces 13, and output monitoring light Lm toward light-receiving elements 14 corresponding to third lens surfaces 13.

<Optical Block-Fitting Part>

In addition to optical elements 11, 18, 17b, 20, and 13 disposed on the light path of optical block 3, a member that supports the mounting to housing 4 is provided in optical block 3.

That is, as illustrated in FIG. 1 to FIG. 5, a pair of protruding fitting pins 21 are provided on upper horizontal surface 17a (specifically, at a position on the surface facing away from photoelectric conversion device-facing surface 17d''' and between reflecting surface 18 and tilted optical surface 17b) along the depth direction in FIG. 1 (vertical direction in FIG. 3) at a predetermined interval. Fitting pins 21 each have a substantially cylindrical shape and serve as an optical block-fitting part for fitting optical block 3 and optical housing 4 together. Fitting pins 21 are formed perpendicularly to upper horizontal surface 17a. Fitting pins 21 may be formed integrally with optical block main body 17 by using a material same as that of optical block main body 17.

It should be noted that the optical block-fitting part is not limited to fitting pins 21. For example, to an extent that the light path between reflecting surface 18 and tilted optical surface 17b is not interfered, a fitting hole (bottomed hole) may be employed as the optical block-fitting part.

[Details of Optical Housing]

Next, details of optical housing 4 are described. As illustrated in FIG. 1 and FIG. 6 to FIG. 10, optical housing 4 has an external shape like an inverted measuring box.

Specifically, as illustrated in FIG. 1 and FIG. 6 to FIG. 10, the external shape of optical housing 4 is roughly composed of top wall part 41, left wall part 42, right wall part 43, front wall part 44 and rear wall part 45. Left and right wall parts 42 and 43 are parallel to each other, and front and rear wall parts 44 and 45 are also parallel to each other. Further, top wall part 41 and each of front, rear, left and right wall parts 42 to 45 are perpendicular to each other.

Optical housing 4 having the above-mentioned configuration houses optical block 3 in such a manner as to surround (shield) optical block 3 from the upward (the side opposite to photoelectric conversion device 7) and from all lateral sides. As illustrated in FIG. 1, in the state where optical block 3 is housed (mounted) in the optical housing 4, internal wall surface 41a of top wall part 41 is in contact with upper horizontal surface 17a of optical block main body 17. In this state, as illustrated in FIG. 1, internal wall surface 42a of left wall part 42 is in contact with left surface 17e of optical block main body 17, and internal wall surface 43a of right wall part 43 is in contact with right surface 17f of optical block main body 17. Further, in this state, the internal wall surface of front wall part 44 is in contact with front surface 17g of optical block main body 17, and the internal wall surface of rear wall part 45 is in contact with rear surface 17h of optical block main body 17. Furthermore, in this state, as illustrated in FIG. 1, the lower end surfaces of side wall parts 42 to 45 are positioned on the same plane as peripheral portion 17d''' of lower surface 17d of optical block main body 17.

<Coupling Light Incidence Surface>

Left wall part 42 of optical housing 4 having the above-mentioned configuration is so disposed as to face optical fiber 8 as illustrated in FIG. 1.

As illustrated in FIG. 1, a portion of internal wall surface 42a of left wall part 42 which faces reflection-and-transmission layer 20 is coupling light incidence surface 23.

On coupling light incidence surface 23, fiber coupling light Lc corresponding to light emitting elements 10 which has been transmitted through reflection-and-transmission layer 20 is incident from the right side in FIG. 1.

Fiber coupling light Lc corresponding to light emitting elements 10 incident on coupling light incidence surface 23 travels to the left side in left wall part 42, as illustrated in FIG. 1.

<Second Lens Surface>

Fiber coupling light Lc corresponding to light emitting elements 10 which has traveled through the inside of left wall part 42 reaches external wall surface 42b of left wall part 42. In the present embodiment, second lens surfaces 12 serving as the coupling light emission surfaces are disposed at positions on external wall surface 42b where fiber coupling light Lc corresponding to light emitting elements 10 reaches.

To be more specific, as illustrated in FIG. 1, FIG. 9 and FIG. 10, portion 42b' having a substantially rectangular shape in plan view is provided in a predetermined range of a center part of external wall surface 42b of left wall part 42, in such a manner as to be recessed rightward in FIG. 1 from peripheral portion 42b" that surrounds portion 42b'. Second lens surfaces 12 are formed on portion 42b' which is recessed in the above-mentioned manner.

As illustrated in FIG. 9, second lens surfaces 12 are each formed as a circular convex lens surface in plan view, and the number of second lens surfaces 12 is the same as that of first lens surfaces 11. In addition, second lens surfaces 12 are formed in such a manner as to be aligned in a direction same as the alignment direction of end surfaces 8a of optical fibers 8, that is, the alignment direction of first lens surfaces 11. Further, second lens surfaces 12 are formed in the same size and at a pitch same as that of first lens surfaces 11. It is also possible that second lens surfaces 12 adjacent to each other are formed in such a manner as to make contact with each other at their circumferential end in the alignment direction. Preferably, optical axis OA (2) of each second lens surface 12 is coaxial with the central axis of surface 8a of optical fiber 8 corresponding to the second lens surface 12. More preferably, optical axis OA (2) of each second lens surface 12 is perpendicular to external wall surface 42b of left wall part 42.

On each second lens surface 12 having the above-mentioned configuration, fiber coupling light Lc corresponding to light emitting elements 10 which has traveled through the inside of left wall part 42 is incident, as illustrated in FIG. 1.

At this time, the central axis of fiber coupling light Lc corresponding to light emitting elements 10 matches optical axis OA (2) of each second lens surface 12. That is, in the present embodiment, the light path of fiber coupling light Lc in the region between coupling light incidence surface 23 and second lens surface 12, and the light path of fiber coupling light Lc just output from second lens surface 12 (that is, the light path of fiber coupling light Lc which has passed through coupling light incidence surface 23) are provided along the same line.

Then, second lens surfaces 12 converge fiber coupling light Lc corresponding to light emitting elements 10 incident on second lens surfaces 12, and output fiber coupling light Lc toward end surfaces 8a of optical fibers 8 corresponding to second lens surfaces 12.

<Optical Housing-Fitting Part>

In addition to the above-mentioned optical elements 23 and 12 disposed along the light path of optical housing 4, optical housing 4 is provided with a member that supports the mounting of optical block 3.

Specifically, as illustrated in FIG. 1 and FIG. 6 to FIG. 10, at positions corresponding to the above-described pair of fitting pins 21 on internal wall surface 41a of top wall part 41, a pair of recessed fitting holes 24 are provided as an optical housing-fitting part. Fitting holes 24 are each configured to be fitted with fitting pin 21 and formed in a round hole. The internal diameter of each fitting hole 24 is slightly greater than the outer diameter of fitting pin 21. In addition, each fitting hole 24 is formed perpendicularly to internal wall surface 41a of top wall part 41.

It should be noted that the optical housing-fitting part is not limited to fitting hole 24, and, for example, a fitting pin may be employed as the optical housing-fitting part.

<Other Configurations of Optical Housing>

In addition to the above-mentioned components, optical housing 4 is provided with a pair of protruding fiber positioning pins 26 as illustrated in FIG. 1 and FIG. 6 to FIG. 10. Fiber positioning pins 26 are provided at positions on peripheral portion 42b" of external wall surface 42b of left wall part 42 and on the outside in the alignment direction of second lens surfaces 12 relative to portion 42b' disposed at the center portion.

When optical fiber 8 is attached to lens array 2, fiber positioning pins 26 are inserted to a pair of fiber positioning holes not illustrated foinied in connector 15, for the positioning of optical fiber 8. Desirably, the fiber positioning holes are round boss holes having the same size that satisfy the dimensional accuracy based on the standard of F12-type multicore optical fiber connectors (IEC 61754-5, JIS C 5981).

[Details of Filler]

Next, details of filler 5 are described. As illustrated in FIG. 1, filler 5 completely fills the space between reflection-and-transmission layer 20 and coupling light incidence surface 23, and thus forms the light path of fiber coupling light Lc between reflection-and-transmission layer 20 and coupling light incidence surface 23.

In addition, filler 5 is composed of an adhesive agent, and stably bonds optical block 3 to the inside of optical housing 4.

Filler 5 may be composed of a heat curable adhesive agent (in other words, thermosetting resin) or an ultraviolet ray-curable adhesive agent (in other words, ultraviolet ray-curable resin).

Desirably, when an ultraviolet ray-curable adhesive agent is employed, at least one of optical block main body 17 and optical housing 4 is formed of an ultraviolet ray-transmitting material (for example, a resin material such as polycarbonate). With this configuration, at the time of manufacturing lens array 2 (at the time of mounting optical block 3 to optical housing 4), ultraviolet ray can be efficiently applied from the outside of optical block 3 or optical housing 4 to the uncured ultraviolet ray-curable adhesive agent provided in advance in a space between optical block 3 and optical housing 4, and thus the ultraviolet ray-curable adhesive agent can be promptly cured.

[Refractive Indices of Optical Block, Optical Housing, and Filler]

As described above, in the present embodiment, the light path of fiber coupling light Lc that has passed through coupling light incidence surface 23 is provided along the same line. Such a linearity of the light path is ensured as described below, together with the above-mentioned configuration in which the direction of laser light La reflected by reflecting surface 18 is parallel to the direction of fiber coupling light Lc output from second lens surface 12.

Specifically, in the present embodiment, the refractive indices of optical block main body 17, optical housing 4 and filler 5 are selected in such a manner that the differences among the refractive indices are each equal to or smaller than a predetermined value. The predetermined value (refractive index difference) may be 0.01, for example. In this case, for example, optical block main body 17 and, also, optical housing 4 may be formed using OKP4 (polycarbonate; Osaka Gas Chemicals Co., Ltd.) by injection molding, and filler 5 may be EA-F5503 (ultraviolet ray type adhesive agent (ultraviolet ray-curable resin); Osaka Gas Chemicals Co., Ltd.). In this manner, optical block main body 17 having a refractive index (wavelength 850 nm) of 1.590, optical housing 4 having a refractive index (wavelength 850 nm) of 1.590, and filler 5 having a refractive index (wavelength 850 nm) of 1.596 can be obtained, and each of their refractive index difference can be set to a value equal to or smaller than 0.01.

With such a configuration, when the refraction at reflection-and-transmission layer 20 is not taken into account, the refraction of fiber coupling light Lc incident on filler 5 and the refraction of fiber coupling light Lc incident on coupling light incidence surface 23 can be almost prevented.

As a result, regardless of the angles of tilted optical surface 17b and coupling light incidence surface 23, the light path of laser light La (Lc) that has passed through reflecting surface 18 can be provided along substantially the same line. As a matter of course, the light path of fiber coupling light Lc that has passed through coupling light incidence surface 23 can also be provided on the same line.

By selecting the refractive index in the above-mentioned manner, the light path can be readily provided. In addition, in the case where deviation of the coupling position of fiber coupling light Lc is found at end surface 8a of optical fiber 8 during the product test, the number of parts that require dimensional adjustment for eliminating the deviation can be reduced (for example, the deviation may be eliminated by only adjusting the angle of reflecting surface 18). This contributes to further facilitation of manufacturability.

In addition, even when a manufacturing error of the light path length between coupling light incidence surface 23 and second lens surface 12 is caused, the influence on the efficiency of coupling to optical fiber 8 can be eliminated. Further, the above-mentioned light path of fiber coupling light Lc provided with sufficient linearity can be relatively easily set by appropriately selecting the reflection direction of laser light La on reflecting surface 18.

[Main Operation and Effect of Lens Array and Optical Module]

With the above-mentioned configuration, laser light La from light emitting elements 10 incident on first lens surfaces 11 is reflected by reflecting surface 18, and thereafter is separated by reflection-and-transmission layer 20 on tilted optical surface 17b into second lens surface 12 side and third lens surface 13 side. Monitoring light Lm separated to third lens surface 13 side in the above-mentioned manner can be output to light-receiving element 14 side by third lens surface 13, and thus monitoring light Lm can be surely obtained.

In addition, with the above-mentioned configuration, first lens surfaces 11 and third lens surfaces 13 are formed on optical block 3 side, and second lens surfaces 12 are formed on optical housing 4 side, and thus each of lens surfaces 11, 12 and 13 can be formed simply and highly accurately in comparison with the case where second lens surface 12 and first and third lens surfaces 11 and 13 which are formed on different surfaces are disposed on single lens array main body.

Then, after simply and highly accurately forming lens surfaces 11, 12 and 13, optical block 3 and optical housing 4 can be simply and highly accurately fitted to each other using fitting pins 21 and fitting holes 24. Thus, lens array 2 with sufficient dimensional accuracy can be readily manufactured.

Further, since reflecting surface 18 of optical block 3 can be shielded by optical housing 4, it is possible to limit adhesion of foreign matters and damage on reflecting surface 18. Thus, stable optical performance can be ensured, and consequently, high reliability can be achieved.

(Modification)

While the differences in the refractive indices of optical block main body 17, optical housing 4 and filler 5 are each set at a value equal to or greater than a predetermined value to ensure linearity of the light path of fiber coupling light Lc that has passed through coupling light incidence surface 23 in the above-described embodiment, the linearity of the light path can be ensured with other configurations.

Specifically, even in the case where the refractive index differences among optical block main body 17, optical housing 4 and filler 5 are relatively large, the linearity of the light path of fiber coupling light Lc that has passed through coupling light incidence surface 23 can be ensured by appropriately setting the angles of tilted optical surface 17b and coupling light incidence surface 23.

Figure 11:
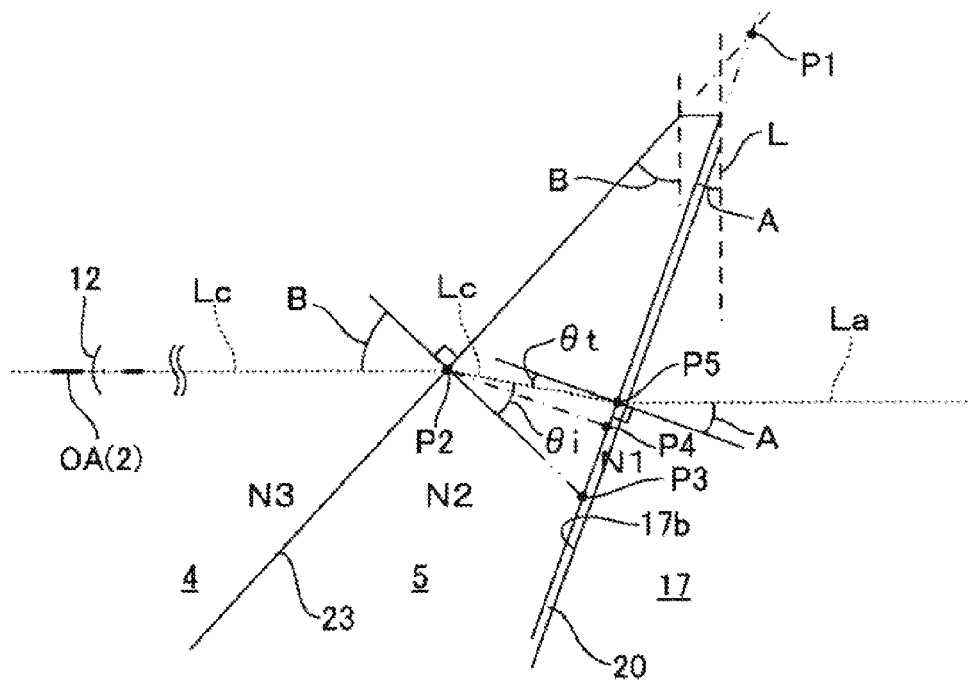
FIG. 11 is a schematic view of a modification of the present invention.

FIG. 11 schematically illustrates an example of the above-mentioned case.

In the configuration illustrated in FIG. 11, filler 5 has a large refractive index, and as a result a large refraction is caused when light is incident on filler 5. However, by appropriately setting the angle of coupling light incidence surface 23 relative to tilted optical surface 17b, and by appropriately selecting the refractive index of optical housing 4 with respect to optical block main body 17 and filler 5, refraction in the opposite direction that can cancel out the above-mentioned large refraction can be caused at the time when light is incident on coupling light incidence surface 23.

In this manner, the refracting direction on coupling light incidence surface 23 can be set at an angle parallel to the light path of laser light La in the space between reflecting surface 18 and tilted optical surface 17b (that is, a light path set to a direction parallel to the direction in which fiber coupling light Lc is output from second lens surface 12). Thus, by only designing a simple configuration in which optical axis OA (2) of second lens surface 12 is provided forwardly of light refracted at coupling light incidence surface 23 along the same line, the linearity of the light path of fiber coupling light Lc that has passed through coupling light incidence surface 23 can be ensured.

Such a configuration can be embodied by adopting a configuration that satisfies the following expression, for example.

$$N2 \cdot \sin[B - A + \arcsin\{(N1/N2)\sin A\}] = N3 \cdot \sin B \qquad (1)$$

In Expression (1), N1, N2 and N3 represent the refractive indices of optical block main body 17, filler 5, and optical housing 4, respectively. In addition, "A" represents the angle of tilted optical surface 17b relative to reference line L extending along the vertical direction in FIG. 11 as a reference (0°), and "B" represents the angle of coupling light incidence surface 23 relative to reference line L as a reference. It is to be noted that reference line L may be perpendicular to photoelectric conversion device-facing surface 17d'.

In addition, in Expression (1), it is the first precondition that the light path of laser light La in the space between reflecting surface 18 and tilted optical surface 17b, and the light path of fiber coupling light Lc that has passed through coupling light incidence surface 23 are both perpendicular to reference line L. The first precondition is equivalent to that the incident angle on tilted optical surface 17b and the refraction angle (emission angle) on coupling light incidence surface 23 are A[°] and B [°], respectively, and therefore is an element that facilitates the designing of the light path.

Further, in Expression (1), it is the second precondition that refraction at reflection-and-transmission layer 20 is not required to be taken into account since the reflection-and-transmission layer 20 is significantly thin. The second precondition is equivalent to that the refractive index of reflection-and-transmission layer 20 can be approximated as N1. That is, when the refractive index of reflection-and-transmission layer 20 is represented by "N," and the refraction angle (emission angle) on reflection-and-transmission layer 20 is represented by "θ," the Snell's law at the interface between optical block main body 17 and reflection-and-transmission layer 20 is represented as N1·sin A (optical block main body 17 side)=N·sin θ (reflection-and-transmission layer 20 side), under the first precondition. Here, the refractive index of reflection-and-transmission layer 20 is not required to be taken into account (second precondition), and this means θ (emission angle)=A (incident angle), specifically, the Snell's law at the interface between optical block main body 17 and reflection-and-transmission layer 20 can be expressed as N1 sin A (optical block main body 17 side)=N·sin A (reflection-and-transmission layer 20 side). "N" that satisfies such an expression is only N1 when $A \neq 0$ is taken into account on the basis of the configuration of the embodiment of the present invention in which monitoring light Lm is reflected to light-receiving element 14 side. In this manner, the refractive index of reflection-and-transmission layer 20 can be taken as N1.

Furthermore, in Expression (1), it is the third precondition that the interface between reflection-and-transmission layer 20 and filler 5 is parallel to tilted optical surface 17b. Under the first precondition and the second precondition, the third precondition is equivalent to that the incident angle at the interface between reflection-and-transmission layer 20 and filler 5 is "A."

Under the first to third preconditions, Expression (1) can be obtained as follows.

Specifically, first, at the interface between reflection-and-transmission layer 20 and filler 5, when the refraction angle is represented by θt, the following expression approximately holds.

$$N1 \cdot \sin A = N2 \cdot \sin \theta t \quad (2)$$

Next, at coupling light incidence surface 23, when the incident angle is represented by θi, the following expression (Snell's law) holds.

$$N2 \cdot \sin \theta i = N3 \cdot \sin B \quad (3)$$

Next, as illustrated in FIG. 11, as two right triangles similar to each other, triangle P1P2P3 and triangle P2P4P3 are assumed. Here, interior angle P3P1P2 of triangle P1P2P3 is equal to B−A. In addition, interior angle P3P2P4 of triangle P2P4P3 is θi−θt when the fact that P4P2P5 is equal to θt on the basis of the relationship of the alternate angles of the parallel lines is taken into consideration. On the basis of the similarity, interior angle P3P1P2 and interior angle P3P2P4 are equal to each other, and obviously, the following expression holds between θt and θi.

$$\theta i - \theta t = B - A \quad (4)$$

Expression (1) can be derived when θt and θi are eliminated from Expressions (2) to (4).

The most simple example that satisfies Expression (1) is the case where the refractive index of optical block main body 17 and the refractive index of optical housing 4 are set at the same refractive index (N1=N3), and tilted optical surface 17b and coupling light incidence surface 23 are so disposed as to be parallel to each other (A=B).

Specifically, in this case, in Expression (1), since B−A of the left side is 0, N3 of the right side is N1, and B of the right side is A, the following modified expression is obtained when the both sides are divided by N2.

$$\sin [\arcsin \{(N1/N2)\sin A\}] = (N1/N2)\sin A \quad (1)'$$

The both sides of Expression (1)' are equal to each other, and therefore the simple example (N1=N3, A=B) satisfies Expression (1).

It should be noted that the present modification is not limited to the simple example and the configuration illustrated in FIG. 11.

According to the present modification, the limitation on the refractive indices of optical block main body 17, filler 5 and optical housing 4 can be reduced, and therefore the number of materials which can be adopted can be increased.

It is to be noted that the present invention is not limited to the above-described embodiment, and can be implemented with various modifications in so far as they are within the scope of the appended claims or the equivalents thereof.

For example, in the above-described embodiment, lens array 2 is described as the optical receptacle, the number of each of lens surfaces 11, 12 and 13, optical fiber 8, light emitting element 10 and light-receiving element 14 may be one.

In addition, in the present invention, an optical transmission member such as light waveguide other than optical fiber 8 may be employed.

This application is entitled to and claims the benefit of Japanese Patent Application No. 2012-127926 filed on Jun. 5, 2012, the disclosure of which including the specification, drawings and abstract is incorporated herein by reference in its entirety.

INDUSTRIAL APPLICABILITY

The optical receptacle and the optical module according to the embodiment of the present invention are suitable for light communications using optical fibers, for example.

REFERENCE SIGNS LIST

1 Optical module
2 Lens array
3 Optical block
4 Optical housing

5 Filler
7 Photoelectric conversion device
8 Optical fiber
10 Light emitting element

The invention claimed is:

1. An optical receptacle that optically couples a light emitting element and an optical transmission member together when the optical receptacle is disposed between a photoelectric conversion device and the optical transmission member, the photoelectric conversion device including the light emitting element and a light-receiving element that receives monitoring light for monitoring light output from the light emitting element, the optical receptacle comprising:
   an optical block which is light-transmissive and is disposed to face the photoelectric conversion device;
   an optical housing which is light-transmissive and houses the optical block therein, the optical housing including an opening that opens to the photoelectric conversion device side such that the optical block is exposed on the photoelectric conversion device side; and
   a filler which is light-transmissive and provided between the optical housing and the optical block, wherein:
   the optical block includes:
   a photoelectric conversion device-facing surface on which light from the light emitting element is incident and from which the monitoring light is output toward the light-receiving element,
   a reflecting surface disposed on a surface opposite to the photoelectric conversion device-facing surface at a predetermined tilted angle relative to the photoelectric conversion device-facing surface, the reflecting surface being configured to receive light of the light emitting element incident on the photoelectric conversion device-facing surface, and reflect the light of the light emitting element thus received toward the optical transmission member,
   a tilted optical surface disposed on a surface opposite to the photoelectric conversion device-facing surface at a position toward which the light of the light emitting element reflected by the reflecting surface travels, the tilted optical surface being disposed at a predetermined tilted angle relative to the photoelectric conversion device-facing surface, and being configured to receive the light of the light emitting element reflected by the reflecting surface,
   a reflection-and-transmission layer disposed on the tilted optical surface, and configured to reflect the light of the light emitting element that reached the tilted optical surface toward the photoelectric conversion device-facing surface at a predetermined reflectance as the monitoring light, and to transmit the light of the light emitting element that reached the tilted optical surface to the optical transmission member side at a predetermined transmittance as coupling light to be coupled to the optical transmission member, and
   an optical block-fitting part disposed on a surface opposite to the photoelectric conversion device-facing surface at a position between the reflecting surface and the tilted optical surface, the optical block-fitting part being configured to fit the optical block and the optical housing together,
   the optical housing includes:
   a coupling light incidence surface disposed on an internal wall surface of a housing side wall part of the optical housing that is so disposed as to face the optical transmission member, the coupling light incidence surface being a surface on which the coupling light is incident,
   a coupling light emission surface disposed on an external wall surface of the housing side wall part, the coupling light emission surface being configured to receive the coupling light incident on the coupling light incidence surface, and to output the coupling light thus received toward the optical transmission member, and
   an optical housing-fitting part disposed at a position corresponding to the optical block-fitting part on a housing top wall part of the optical housing that shields the optical block from a side opposite to the photoelectric conversion device, the optical housing-fitting part being configured to fit with the optical block-fitting part, and
   the filler is provided between the reflection-and-transmission layer and the coupling light incidence surface.

2. The optical receptacle according to claim 1, wherein
   the reflecting surface is disposed in such a manner that the reflecting surface reflects light of the light emitting element in a direction parallel to a direction in which the coupling light is output from the coupling light emission surface, and
   refractive indices of the optical block, the optical housing and the filler are selected and angles of the tilted optical surface and the coupling light incidence surface are selected as necessary, so as to provide along a same line a light path of the coupling light between the coupling light incidence surface and the coupling light emission surface, and a light path of the coupling light just output from the coupling light emission surface.

3. The optical receptacle according to claim 2, wherein the refractive indices of the optical block, the optical housing and the filler are selected such that differences between the refractive indices are each equal to or smaller than a predetermined value.

4. The optical receptacle according to claim 1, wherein
   the filler is composed of an ultraviolet ray-curable adhesive agent, and
   at least one of the optical block and the optical housing is formed of an ultraviolet ray-transmitting material.

5. The optical receptacle according to claim 1, wherein the reflecting surface is a total reflection surface on which light of the light emitting element is incident at an incident angle greater than a critical angle, and by which the light of the light emitting element incident on the total reflection surface is totally reflected toward the tilted optical surface.

6. The optical receptacle according to claim 1, wherein
   a first lens surface configured to input light of the light emitting element toward the reflecting surface is disposed at a position corresponding to the light emitting element on the photoelectric conversion device-facing surface,
   the coupling light emission surface is a second lens surface, and
   a third lens surface configured to output the monitoring light toward the light-receiving element is disposed at a position corresponding to the light-receiving element on the photoelectric conversion device-facing surface.

7. An optical module comprising:
   the optical receptacle and the photoelectric conversion device according to claim 1.

8. The optical receptacle according to claim 1, wherein the refractive indices of the optical block, optical housing and filler are selected such that the differences among the refractive indices are each equal to or smaller than a predetermined value.

9. The optical receptacle according to claim 1, wherein in a case where the refractive index differences among the optical block, optical housing and filler are large, the linearity of the light path of the coupling light that has passed through coupling light incidence surface can be ensured by appropriately setting the angles of the tilted optical surface and the coupling light incidence surface.

* * * * *